US006801667B1

(12) United States Patent
Lindquist

(10) Patent No.: US 6,801,667 B1
(45) Date of Patent: Oct. 5, 2004

(54) METHOD AND APPARATUS FOR RE-ORDERING OF A BIT STREAM

(75) Inventor: Timothy John Lindquist, Thornleigh (AU)

(73) Assignee: Canon Kabushiki Kaisha, Tokyo (JP)

( * ) Notice: Subject to any disclaimer, the term of this patent is extended or adjusted under 35 U.S.C. 154(b) by 564 days.

(21) Appl. No.: 09/613,281

(22) Filed: Jul. 10, 2000

(30) Foreign Application Priority Data

Jul. 12, 1999 (AU) .............................................. PQ1561

(51) Int. Cl.[7] .................................................. G06K 9/36
(52) U.S. Cl. .................. 382/240; 382/248; 375/240.11
(58) Field of Search ................................ 382/232–248; 375/240–241

(56) References Cited

U.S. PATENT DOCUMENTS

| | | | | |
|---|---|---|---|---|
| 5,822,459 A | * | 10/1998 | Macy | 382/240 |
| 5,835,636 A | * | 11/1998 | Auld | 382/233 |
| 5,881,176 A | * | 3/1999 | Keith et al. | 382/248 |
| 6,393,060 B1 | * | 5/2002 | Jeong | 375/240.19 |
| 6,560,369 B1 | * | 5/2003 | Sato | 382/239 |

FOREIGN PATENT DOCUMENTS

EP 0 765 090 A2 3/1997 .......... H04N/9/804

OTHER PUBLICATIONS

U.S. patent application Ser. No. 09/337,533, filed Jun. 22, 1999.

* cited by examiner

Primary Examiner—Jingge Wu
(74) Attorney, Agent, or Firm—Fitzpatrick, Cella, Harper & Scinto

(57) ABSTRACT

A method of selecting transform segments from a data stream (426), the stream comprising a plurality of blocks each comprising a plurality of transform segments, is disclosed. The selection reorders the transform segments in a block, and comprises, for each said block, steps of selecting a first set of transform segments (426–432) suitable for direct inverse transformation to form a first data segment, selecting a second transform segment (1612) which is directly inverse transformable given availability of the first set (426–432), identifying a third transform segment (1608, 1610) which is not directly inverse transformable given availability of the first set (426–432) and the second transform segment (1612), and selecting a fourth transform segment (1610, 1608) which is required to support direct inverse transformation of the third transform segment (1608, 1610).

16 Claims, 11 Drawing Sheets

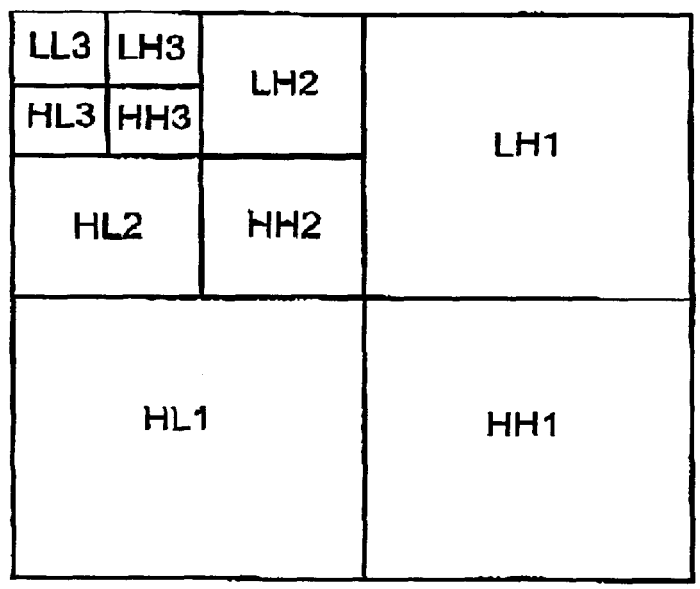
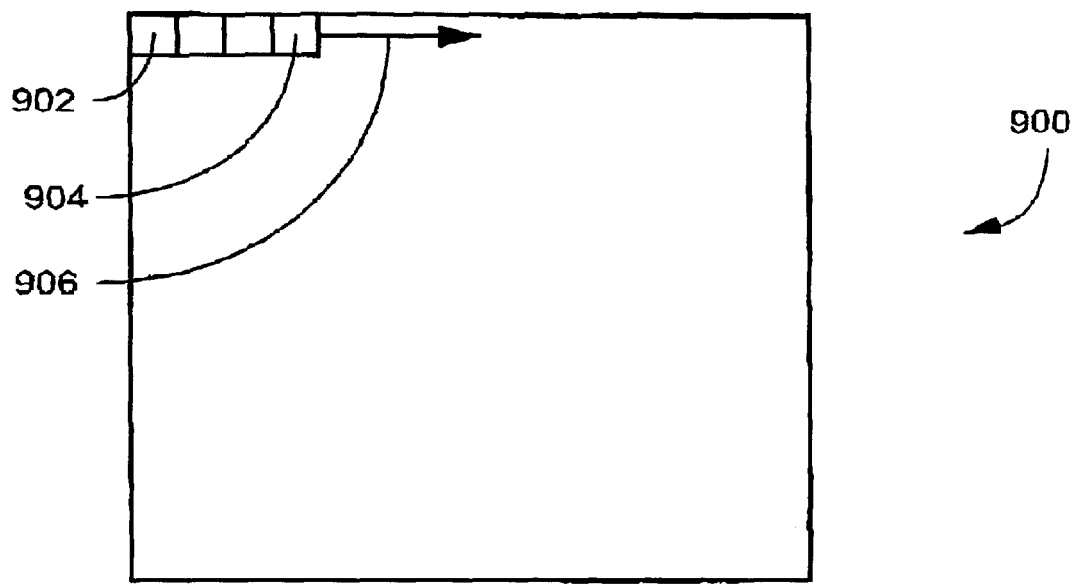
Fig. 7

US 6,801,667 B1

METHOD AND APPARATUS FOR RE-ORDERING OF A BIT STREAM

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates generally to image compression technology, and in particular, to the use of transform techniques in a manner which improves the performance of the decompression process, especially for scanline and band-based systems which produce decompressed output in raster order.

BACKGROUND ART

Typically, data compression using wavelet techniques is, in broad terms, a two step process. This can be seen in FIG. 1, where a data block 100, undergoes a wavelet transform process 104, and a subsequent coding process 108. It is noted that transform data is segmented, and segments are coded independently. Thereafter, the coded data stream is transmitted, either over a network between disparate equipment, or over a backplane, within a single piece of equipment, as exemplified by an arrow 110, and input to a decoding process 112. The decoding process then outputs a decoded data stream 114 to an inverse wavelet transform process 116, where-after a reconstituted data block 120 is produced.

A standard decomposition process 104 for computing wavelet transforms of the input data block 100 generates sub-band data which is not spatially localized. If this data is coded by the process 108 into a data stream without any re-ordering, then the input buffer implemented at the decoder 112 must be able to store the information required to decode a particular output data point in the data block 120, the needed information being distributed in the data stream.

Turning to FIG. 2, wavelet transformation of a data block 400 is typically performed using high pass and low pass filtering operations, and also a decimation (ie. down sampling) by two, resulting, initially, in production of two output data sets i.e. the high pass and low pass sub-bands. The aforementioned process constitutes a single "level" of transformation. The wavelet transform process can be multi-level, consequently storing the high pass sub-band at each level, and then recursively applying the filtering/decimation operation to the resultant low pass sub-band. Each such step produces another level, and the process continues, typically, for some predetermined number of levels, or until some cost or error function is satisfied. In FIG. 2, an input data block 400 of length 436 (i.e. "u") is transformed into a data set 402 which comprises a low pass third level segment 404 (i.e. L3), a high pass third level segment 406 (i.e. H3), a high pass second level segment 408 (i.e. H2), and a high pass first level segment 410 (i.e. H1). The transformed data set 402 has the same length 436 as the input data set 400, since no data compression has been performed. Compression can be achieved by coding the transformed data set 402. In one method of coding, the transformed data set 402 is first segmented into equal sized segments of length 438 (i.e. of width "w") as shown in the segmented data set 412. Additional information can also be incorporated into the data set 412, in order to identify start and end points of each segment of length 438. Thereafter, each transformed segment 414 can be independently coded to form an equivalent coded segment 418. When compression is performed, each segment 414 will "shrink" in size according to the compression achieved on a per-segment basis, and thus the coded data set 416 can have a shorter length than the original data block 400, and the transformed data set 402. The issue of compression coding is not the direct focus in the present specification, and it will thus hence forth be assumed, for the sake of ease of description, that no actual compression gain is sought. It is noted that the discussion is however equally relevant if compression gain were to be provided.

The coding of the transform data set 412, under the assumption of zero compression gain, produces a coded data set 416, where each segment 418 corresponds directly to the uncoded data item 414 in data set 412.

The inverse wavelet transform requires, for each reconstituted data segment 424, constituent segments which are distributed across the data set 420. Thus, for example, data segment 424 in the inverse transformed data set 422 (this being the recovered data block equivalent to original data segment 440 in the data block 400), requires constituent data segments 426, 428, 430 and 432, i.e. one segment from each sub-band L3, H3, H2 and H1. Consequently, not only is a delay (represented by an arrow 434) incurred before the inverse transformation of the segment 424 can occur, but in addition, the data items $Z_1$ through $Z_9$ (see data set 416) are required to be stored (or alternatively the unneeded segments $Z_2$, $Z_4$, $Z_6$–$Z_8$ are discarded and subsequently re-transmitted as needed). Therefore, the minimum information required at the inverse transform process 116 (see FIG. 1) in order to produce the output in raster order is the coded information that corresponds to the data segments 426, 428, 430 and 432. If the compressed data stream 416 is sent in sequential order as shown in FIG. 2 without the any rearrangement or re-ordering, the inverse transform process 116 must wait until all the coded data segments through to the first segment of the H1 level 410 has been received. This extracts a penalty in both memory requirements, and latency in the decode/inverse transform processes 112, 116. The time delay, or equivalently the memory required, which is associated with the data which must be stored before the inverse transform can be applied to recover the first segment 424 is represented presented mathematically by:

$$(u/2)+w$$

where u is the span, or length of the data set 400 (ie. 436), and w is the length of the individual segment 438. This representation assumes zero compression gain.

An unordered segment stream therefore results in a penalty in memory requirements and/or in the delay suffered before a given data point in the recovered data block can be recovered.

SUMMARY OF THE INVENTION

It is an object of the present invention to substantially overcome, or at least ameliorate, one or more disadvantages of existing arrangements.

According to a first aspect of the invention, there is provided a method of selecting transform segments from a data stream, the stream comprising a plurality of blocks each comprising a plurality of transform segments, the selection of said segments reordering the transform segments in at least one said block, the method comprising, for each said block, the steps of:

selecting a first set of transform segments suitable for direct inverse transformation to form a first data segment;

selecting a second transform segment being directly inverse transformable dependent upon the first set;

identifying a third transform segment not being directly inverse transformable dependent upon the first set and the second transform segment; and selecting a fourth transform segment required to support direct inverse transformation of the third transform segment.

According to a second aspect of the invention, there is provided a method of ordering transform segments from a data stream for an image decoder, the stream comprising a plurality of blocks each comprising a plurality of transform segments, the ordering of said segments characterised in that the ordering results in a smaller set of transform segments that need to be stored, thus reducing a size of storage means in the image decoder.

According to a third aspect of the invention, there is provided a method of ordering transform segments from a data stream for an image decoder, the stream comprising a plurality of blocks each comprising a plurality of transform segments, the ordering of said segments characterised in that the ordering allows immediate application of an inverse discrete wavelet transform, thereby reducing a latency in the image decoder.

According to a fourth aspect of the invention, there is provided a method of ordering transform segments from a data stream for an image decoder, the stream comprising a plurality of blocks each comprising a plurality of transform segments, the ordering of said segments characterised in that the ordering allows raster operation of the image decoder for scanlines or bands.

According to a fifth aspect of the invention, there is provided an apparatus selecting transform segments from a data stream, the stream comprising a plurality of blocks each comprising a plurality of transform segments, the selection of said segments reordering the transform segments in at least one said block, the apparatus comprising:

first transform segment selection means adapted to select a first set of transform segments suitable for direct inverse transformation to form a first data segment;

second transform segment selection means, adapted to select a second transform segment being directly inverse transformable dependent upon the first set; and third transform segment identification means, adapted to identify a third transform segment not being directly inverse transformable dependent upon the first set and the second transform segment; and a fourth transform segment selection means, adapted to select a fourth transform segment required to support direct inverse transformation of the third transform segment.

According to a sixth aspect of the invention, there is provided a computer readable memory medium for storing a program for apparatus which selects transform segments from a data stream, said program comprising:

code for a first selecting step for selecting a first set of transform segments suitable for direct inverse transformation to form a first data segment;

code for a second selecting step for selecting a second transform segment being directly inverse transformable dependent upon the first set;

code for an identifying step for identifying a third transform segment not being directly inverse transformable dependent upon the first set and the second transform segment; and code for a third selecting step for selecting a fourth transform segment required to support direct inverse transformation of the third transform segment.

According to a seventh aspect of the invention, there is provided a computer readable memory medium for storing a program for apparatus which orders transform segments from a data stream for an image decoder, the stream comprising a plurality of blocks each comprising a plurality of transform segments, said program comprising code whereby the ordering of said segments is characterised in that the ordering results in a smaller set of transform segments that need to be stored, thus reducing a size of storage means in the image decoder.

According to an eighth aspect of the invention, there is provided a computer readable memory medium for storing a program for apparatus which orders transform segments from a data stream for an image decoder, the stream comprising a plurality of blocks each comprising a plurality of transform segments, said program comprising code whereby ordering of said segments is characterised in that the ordering allows immediate application of an inverse discrete wavelet transform, thereby reducing a latency in the image decoder.

According to a ninth aspect of the invention, there is provided a computer readable memory medium for storing a program for apparatus which orders transform segments from a data stream for an image decoder, the stream comprising a plurality of blocks each comprising a plurality of transform segments, said program comprising code whereby ordering of said segments is characterised in that the ordering allows raster operation of the image decoder for scanlines or bands.

The present invention thus optimizes the ordering of coded segments from the coding process 108 in a manner which supports the compression in the decoder/inverse transform process (112,116), while also reducing memory requirements and delay in said processes.

BRIEF DESCRIPTION OF THE DRAWINGS

A number of preferred embodiments of the present invention will now be described with reference to the drawings, in which:

FIG. 7 illustrates an output sequence of segments relating to FIG. 6;

DETAILED DESCRIPTION INCLUDING BEST MODE

Figure 1:
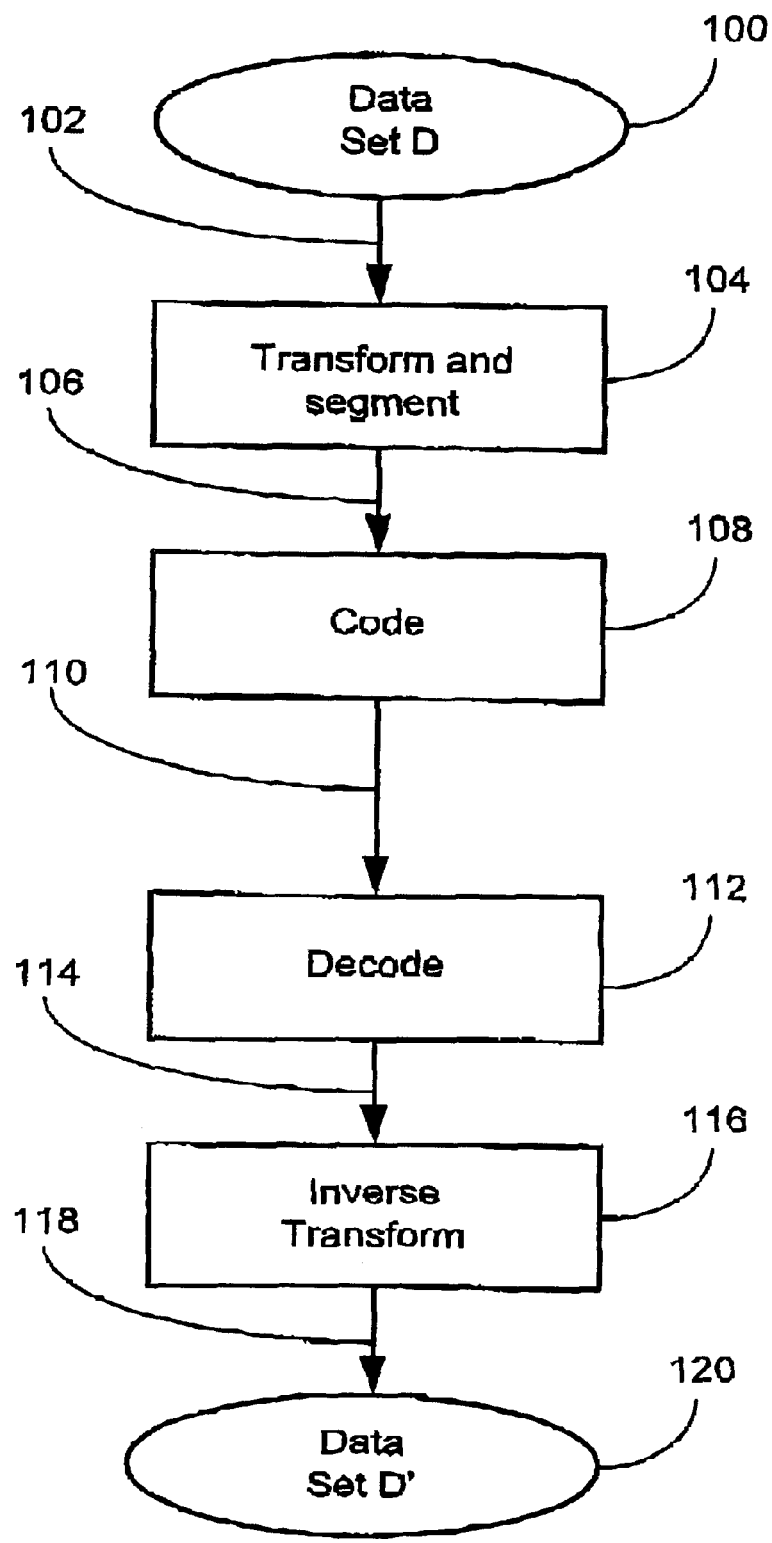
FIG. 1 is a flow diagram depicting a compression/decompression process, whereby a preferred embodiment of the present invention can be practiced.

Where reference is made in any one or more of the accompanying drawings to steps and/or features, which have the same reference numerals, those steps and/or features have for the purposes of this description the same function (s) or operation(s), unless the contrary intention appears.

Returning to FIG. 1, it will be shown that embodiments described below provide an improved system for implementing wavelet based compression, such that decompression in raster order is possible while ensuring that memory requirements, and delay (ie. latency) at the decoder/inverse transform process (112, 116) are reduced. This is achieved by reordering the coded data segments from the coding process 108 prior to transferring this information, depicted by an arrow 110, to the decoding process 112. This technique is applicable to a data set which comprises any number of dimensions.

Due to the decimation factor used in the computation of the forward discrete wavelet transform, a segment at any particular level corresponds to a segment twice the size at the next higher level. Since segments are assumed to be a constant size, this means that applying the inverse transform to a segment at one level will satisfy the inverse transform requirements of the two corresponding segments at the next higher level, ie. the next level closer to level 0. The actual inverse transform process is essentially the reverse of the forward transform process. At the lowest level i.e. j, the lowpass and highpass subbands are upscaled and then filtered by their corresponding synthesis filters, and the results are then added to produce the lowpass subband information at the next higher level. This proceeds recursively until the subbands at the highest level are processed.

Taking advantage of this fact, after the entire initial sequence required to produce the output points corresponding to the first segment has been sent to the decoder, further coded segments are sequenced in a binary fashion (for a one dimensional description).

Once the required segments are decoded, the inverse transform may be applied, upscaling both highpass and lowpass by 2 at each level before convolving the lowpass data with the synthesis filter and the highpass data with an associated synthesis filter and adding to produce the L sub band at the next level.

Figure 2:
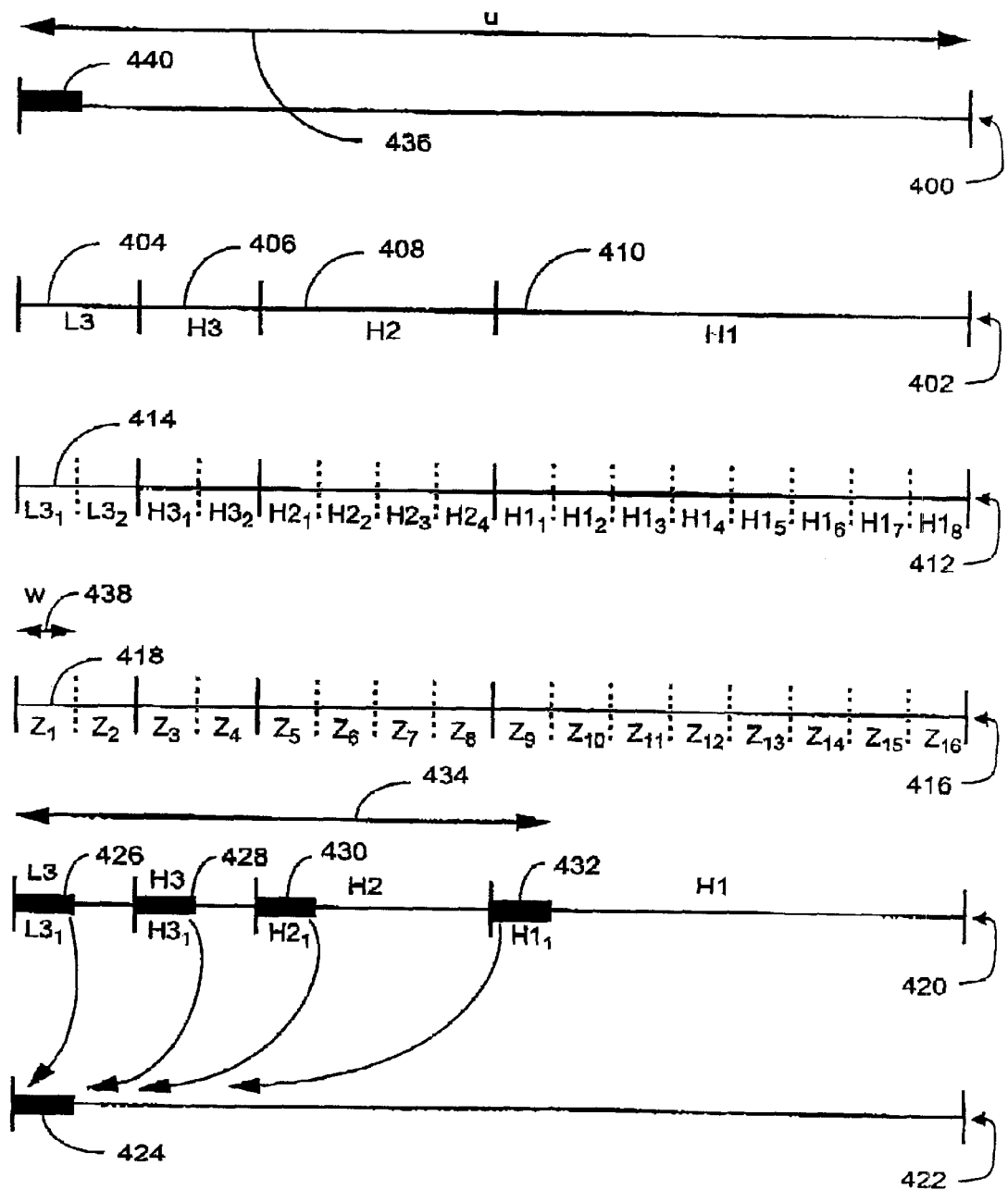
FIG. 2 illustrates standard ordering of data segments in 1-D data for a 3 level transform.
Figure 3:
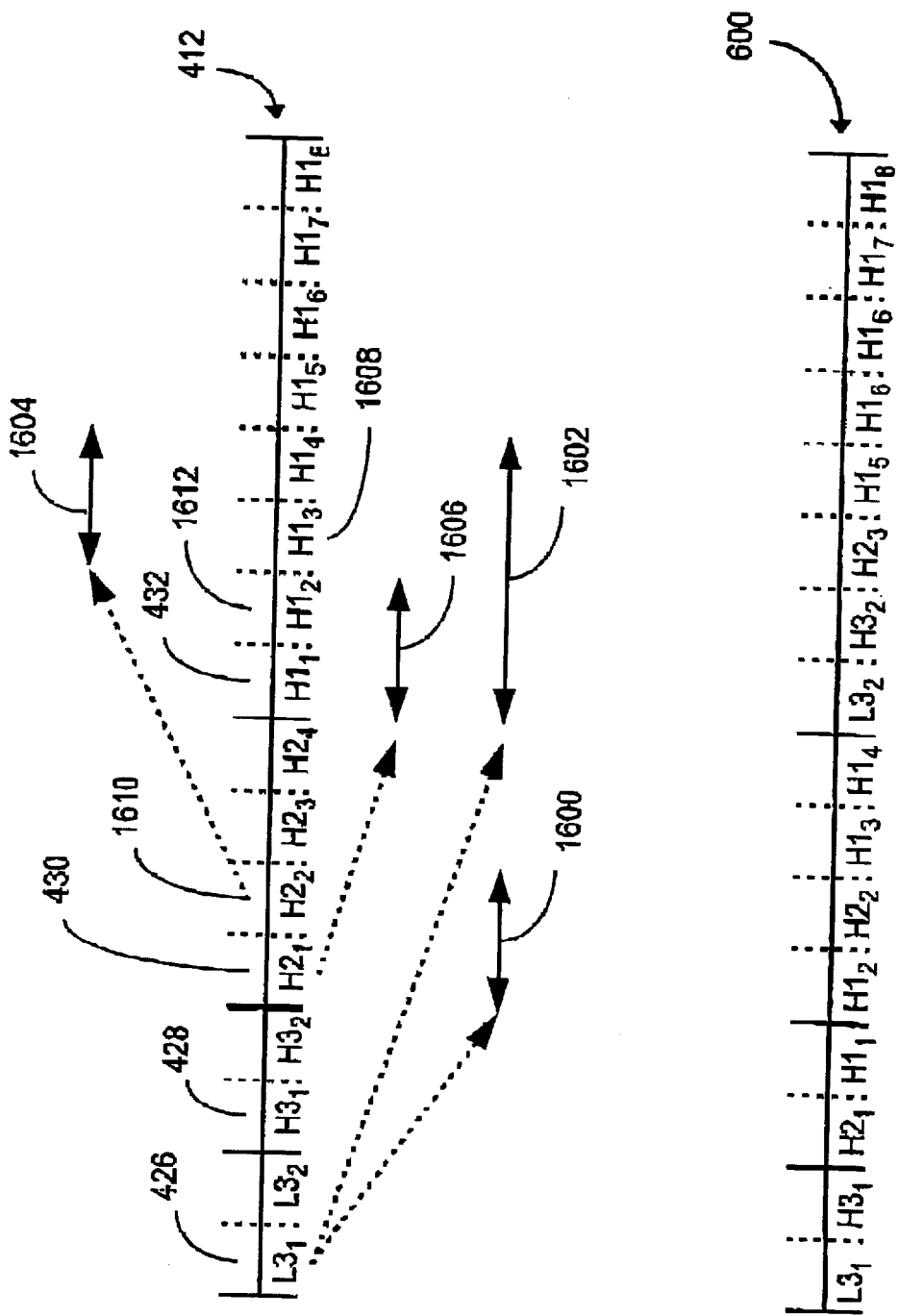
FIG. 3 illustrates data segment re-ordering for 1-D data according to a preferred embodiment.

FIG. 3 illustrates, in relation to the one-dimensional data set 412, how an improved ordering 600 of the data segments in the block 412 is derived. The data reordering described takes advantage of the upsampling process which occurs in the inverse transform. Recalling FIG. 2, in order to obtain the first data segment 424, the transform segments 426 to 432 are immediately required, and thus selected immediately for the data stream 110. Due to the up-sampling process, the segment 426, having been selected and thus being available, can contribute to inverse transformability for two segments in the next higher resolution sub-band as depicted by an arrow 1600, and for four segments in the following higher resolution sub-band as depicted by an arrow 1602. Similarly, the segment 430, having been selected and thus being available, contributes to inverse transformability for two segments in the next higher resolution sub-band as depicted by an arrow 1606. A segment 1612 is thus immediately inverse transformable given the availability of the segments 426 and 430. This is seen pictorially since the segment 1612 falls "within the span" of the arrows 1602 and 1606. In contrast, a segment 1608 falls within the span of the arrow 1602, however outside the span of the arrow 1606, and therefore a segment 1610 must first be selected in order to contribute to the inverse transformability of the segment 1608 as depicted by the arrow 1604. In this manner, segments are selected, and thereby a successive reordering takes place. Segments which are immediately transformable in light of already selected segments are immediately themselves selected. When there are no further segments which are immediately transformable, segments in a lower resolution band which contribute to the inverse transformability of segments in a higher band are selected. Thereafter, segments which are consequently immediately transformable in light of the now already selected segments are immediately selected, and so on.

When the reordering is complete, the data block 412 displaying original segment order, is shown reordered in the form shown in 600. When using this approach, the maximum delay can be expressed mathematically as:

$$2^n + (2^n - 1) * (j - 1)$$

where j is the number of levels used in calculating the transform, and n is the number of dimensions. This corresponds to the number of coded segments required to commence and complete decompression of the first output point. This is a significant improvement on the non-reordered approach, which requires (u/w)/2+1 coded segments.

The aforementioned type of optimization is applicable for data consisting of any number of dimensions.

Before proceeding further, a number of output arrangements are described. At the decompressor, a buffer can be partitioned into separate regions dedicated to input, intermediate and output data respectively. The input region can store incoming coded blocks until they can be decoded and the intermediate region can store decoded blocks resulting from the input coded blocks. The output region can accept data in several modes which shall be described. There is no constraint on partitions to be non overlapping. In fact, a partition, or segments of a partition, may overlap other partitions. An example of this may be where encoded blocks are overwritten by the decoded blocks, since the encoded information is no longer required at that stage.

In relation to the output partition, several modes are identified. The output region may be part of the decoder buffer memory system, or may be external to the decoder. The distinction here is that in the former case, output data is computed and stored within the buffer system, and then the buffer system feeds the output device, whilst in the latter case the decoder generates output data which feeds directly the input of the output device. An example of the latter is where the decoder feeds a FIFO (First-In First-Out buffer) which forms the input of the output device. Such a FIFO may accept a single line of data sequentially, in the case of a scanline oriented output device, or multiple lines in a parallel sequential fashion, in the case of a band oriented output device.

Thus two fundamental output modes are identified. The output partition can operate on a line by line mode, that is, in scanline order. Alternatively, the output region may accept bands of data, where a band is defined as having a y value greater than 1. Special cases are those where the band is able to accommodate in the y direction the result from an integral number of processed blocks from the subband blocks at level 1. Note that, due to synthesis filter overlap between blocks at block boundaries, it is not possible to produce an integral number of output blocks directly from blocks from level 1. Subband blocks at level 1 correspond to an output region that is 2*w–INT(n/2) where n is the number of taps in the synthesis filter and INT() denotes the integer of the argument in brackets. To create output data from the boundary of the block at the preceding level requires data from the block adjacent to that boundary. The impact of this constraint is that rather than immediately producing a 2*w size output block, a 2*w–INT(n/2) size output block is produced, and the remainder of the output block is produced when the adjacent level 1 subband blocks are processed (i.e. the triplet that is adjacent to the triplet processed in the previous step—the concept of a triplet is described shortly).

As already stated, the purpose of the present invention is to optimise the ordering of blocks sent to the decoder in order to allow decompression in a raster order whilst minimising memory requirements and latency. Hence, the implementation of the inverse DWT (i.e. Discrete Wavelet Transform), in itself, is not addressed here. Only the ordering of blocks required to support the application of the DWT to enable raster order decompression is addressed.

Figure 4:
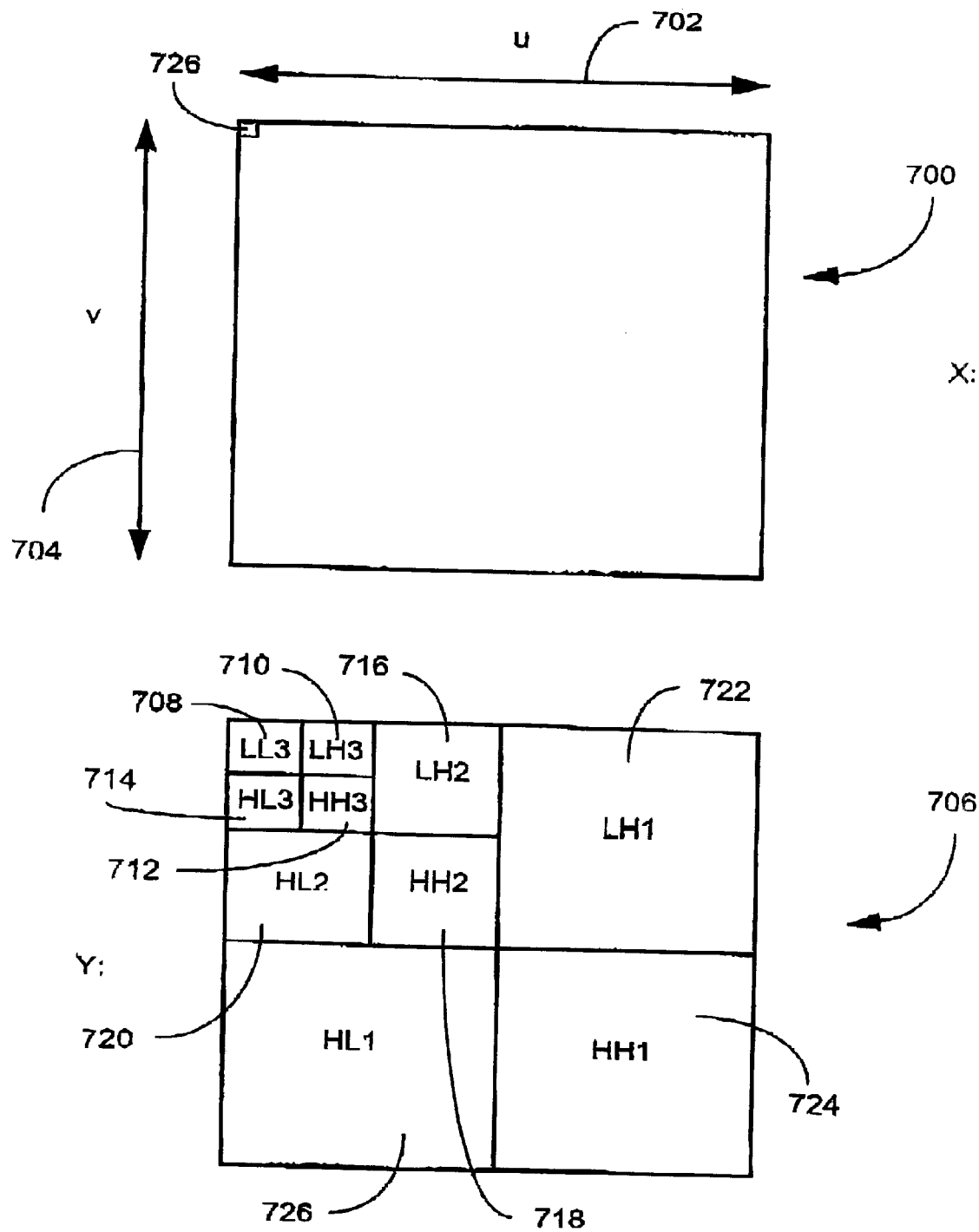
FIG. 4 depicts a 2-D transformed data set for a 3 level transform.

FIG. 4, illustrates the optimization for the case of two-dimensional data, this being common in the field of image processing. Due to physical constraints of image output devices, output processing (i.e. decompression/inverse transformation) in raster-order is often desired. In FIG. 4, a two-dimensional data set 700 with a width 702 (i.e. "u") and a height 704 (i.e. "v") undergoes wavelet transformation to a form 706. The transformed data set 706 comprises a DC or lowcast resolution sub-band 708 (i.e. LL3), a next-higher resolution band comprising three blocks 710, 712 and 714 (i.e. LH3, HH3 and HL3 respectively), yet higher resolution sub-bands 716, 718 and 720 (i.e. LH2, HH2 and HL2 respectively), and finally the highest resolution sub-bands 722, 724 and 726 (i.e. LH1, HH1 and HL1 respectively).

Figure 5:
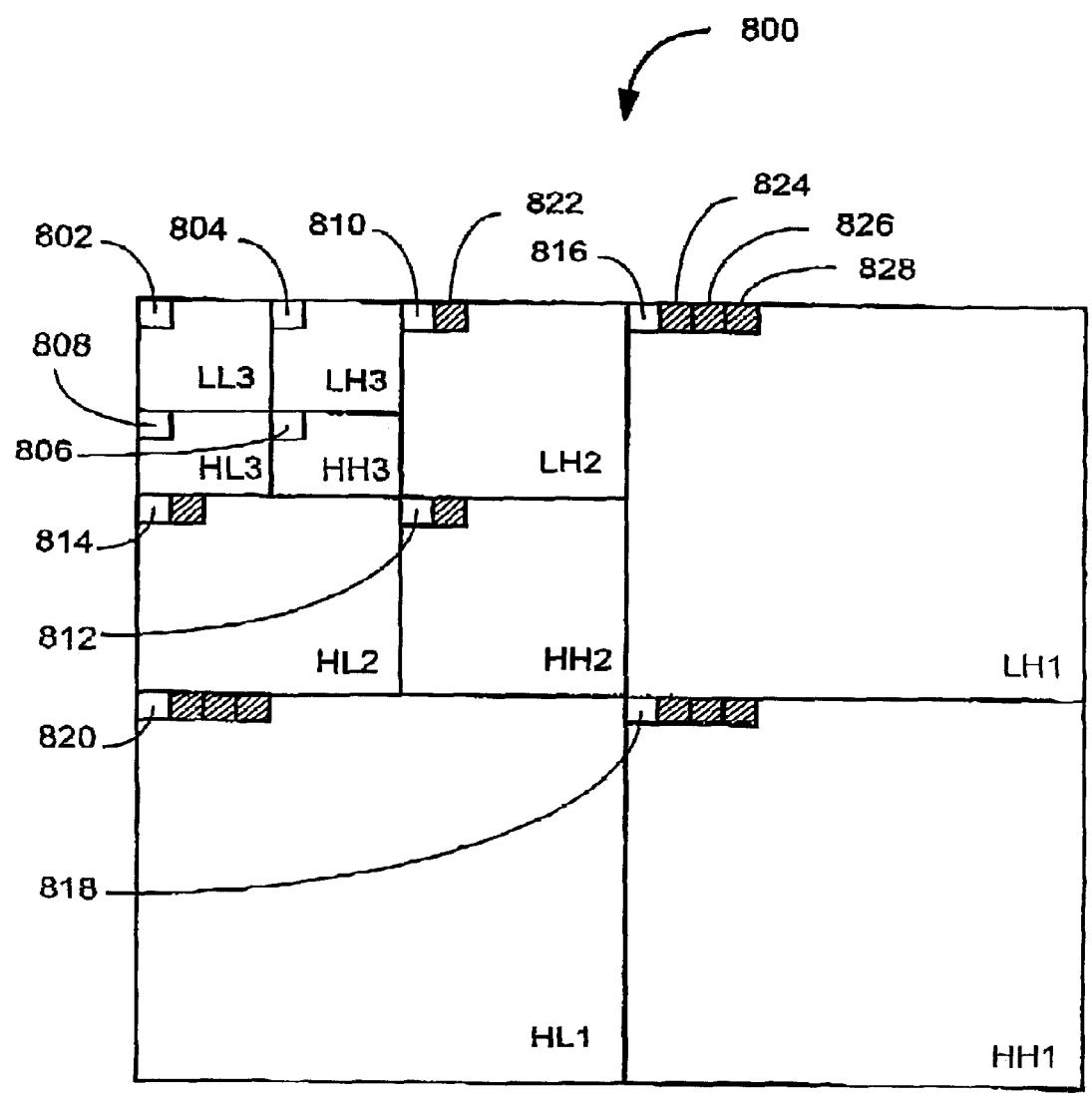
FIG. 5 depicts inverse transform requirements relating to FIG. 4.

In FIG. 5 considering the transformed data set 706, it is apparent that no output segments can be produced until the input buffer of the decoder/inverse transform process contains all segments 802, to 820. If a data stream for the data set 706 is in typical linear order (i.e. in raster segment order starting at segment 802 and continuing through to segment 818 and so on), a buffer size will be required which is at least (u/w*v/2/w+u/2/w+1)*word size, where u is the width of the data set, v is the height of the data set, and w is the segment size.

In order to produce output in a scanline mode, all the subband block associated with a particular output position must be decoded. In this respect, the block ordering requirement of a scanline output system are no different from the ordering requirement of a band output system where the band depth in the y direction is between 2 and 2*w–INT(n/2) lines i.e corresponding to a single corresponding block from each of the subbands at level 1. Thus, in reality, two primary block reordering schemes are identified. The first satisfies the requirements of scanline output systems and band systems where the band depth is less than or equal to 2*w–INT(n/2) lines; let this be Case A. The second satisfies bands of depth greater than 2*–INT(n/2) lines; let this be Case B.

Figure 6:
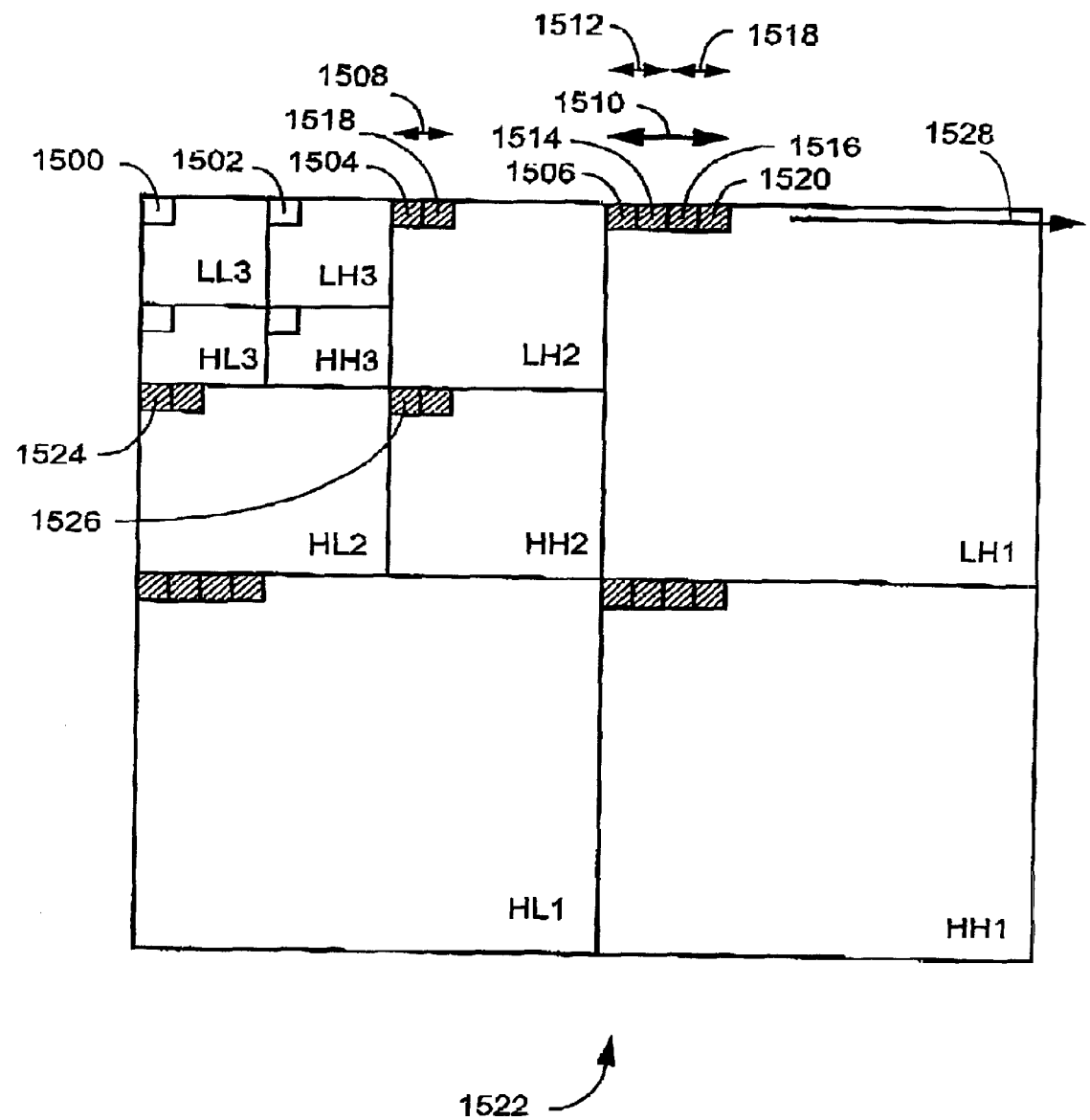
FIG. 6 depicts reordering for 2-D data in a scanline embodiment.

FIG. 6 presents the re-ordering process in more detail as applied to a two dimensional data set 1522 according to case A. In the following description, segments on the first scan line (depicted by an arrow 1528) will be referred to. It should be understood however, that reference in the description to a segment 1504 in a sub-band $LH_2$, is actually a reference to a triplet comprising segments 1504, 1524, 1526 in sub-bands $LH_2$, $HL_2$, and $HH_2$ respectively, where the order of the segments is not important. Any ordering of coded blocks $LH1_{(1,1)}, HL1_{(1,1)}, HH1_{(1,1)}$ is denoted as the triplet $T1_{(1,1)}$. Note that the subscripts denote the block reference in the x and y direction within the subband.

In order to recover the first data segment 726 (see FIG. 4), triplets 1500 to 1506 are required, and thus immediately selected. Due to the upsampling process, the segment 1500 in the sub-band $LL_3$ contributes to inverse transformability for two segments (considering only the line of segments horizontal to the first segment 1500 and exemplified by and arrow 1528) in the next higher resolution sub-band as shown by an arrow 1508, and for four segments in the following higher resolution sub-band $LH_1$ as shown by an arrow 1510. Similarly, the segment 1504 contributes to inverse transformability for two segments in the next higher resolution sub-band $LH_1$ as shown by an arrow 1512. The segment 1514 is thus immediately inverse transformable and is selected since it falls within the span of arrows 1510 and 1512. In contrast, segment 1516 falls within the span of arrow 1510, however outside the span of arrow 1512, and therefore a segment 1518 must now be selected in order to contribute to the inverse transformability of the segment 1516 as shown by an arrow 1518. For the assumed transform depth of three levels, the first portion of the optimal reordering is:

$DC_{(1,1)}, T3_{(1,1)}, T2_{(1,1)}, T1_{(1,1)}, T1_{(1,2)}, T2_{(1,2)}, T1_{(1,3)}, T1_{(1,4)}, DC_{(1,2)}, T3_{(1,2)}, T2_{(1,3)}, T1_{(1,5)}, T1_{(1,6)} \ldots$ where: $DC_{(1,1)}$ represents segment 1500, $T2_{(1,1)}$ represents segments 1504, 1526 and 1524 and so on.

FIG. 7 illustrates the output mode associated with the process described in relation to FIG. 6, namely a segment "scan-line" output mode. Thus, applying the process described in relation to FIG. 6 to the transformed data set 706 results in recovery of inverse transformed data set 900, this recovery being performed on a scan-line basis depicted by an arrow 906, producing data segments 902 . . . 904 . . . etc.

Figure 8:
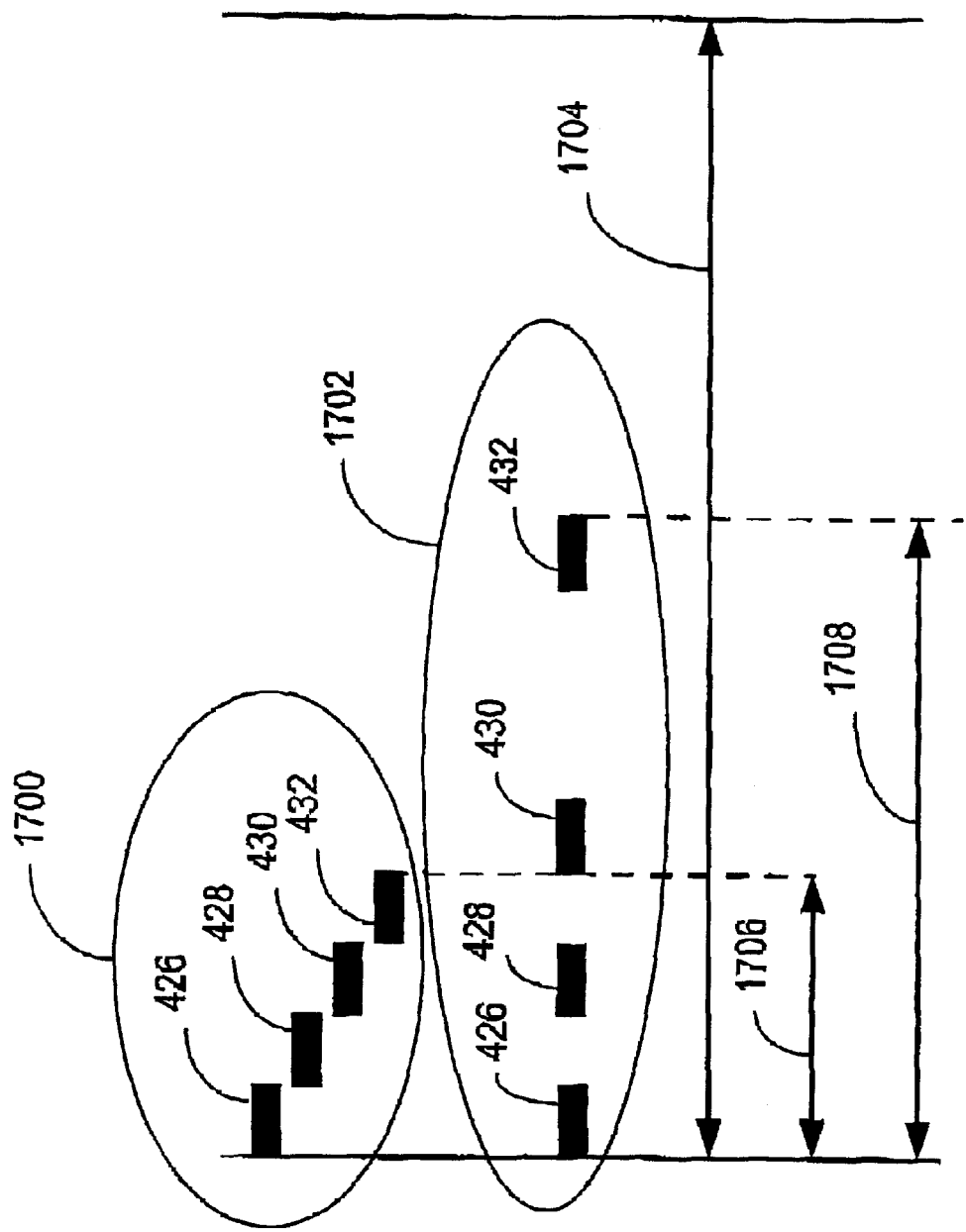
FIG. 8 illustrates delay reduction as a result of reordering.

FIG. 8 illustrates the effect of reordering on delay. When transformed data is not reordered, then the time taken to receive all transformed data segments required to decode the first data segment on the scanline is depicted by an arrow 1708. Since the total time to receive all transformed data segments on a given scan line is invariant and is depicted by an arrow 1704, and since the decoder/inverse transform process must immediately thereafter being processing the following scanline, the time available to decoder/inverse transform the scanline is given by a time exemplified by a time 1704 minus a time 1708 (neglecting the time taken to perform the inverse transform process). In the re-ordered case, the time taken to receive all transformed data segments required to decode the first data segment on the scanline is depicted by an arrow 1706, and consequently the time available to decoder/inverse transform the scanline is given by a time depicted by a time 1704 minus a time 1708. This longer time period available for decoding/inverse transforming reduces the demands for processing speed and memory requirements of the decoding/inverse transform process. Scanline processing focuses on minimizing the delay 1706, which minimizes the speed demands on the decoding/inverse transforming process.

Figure 9:
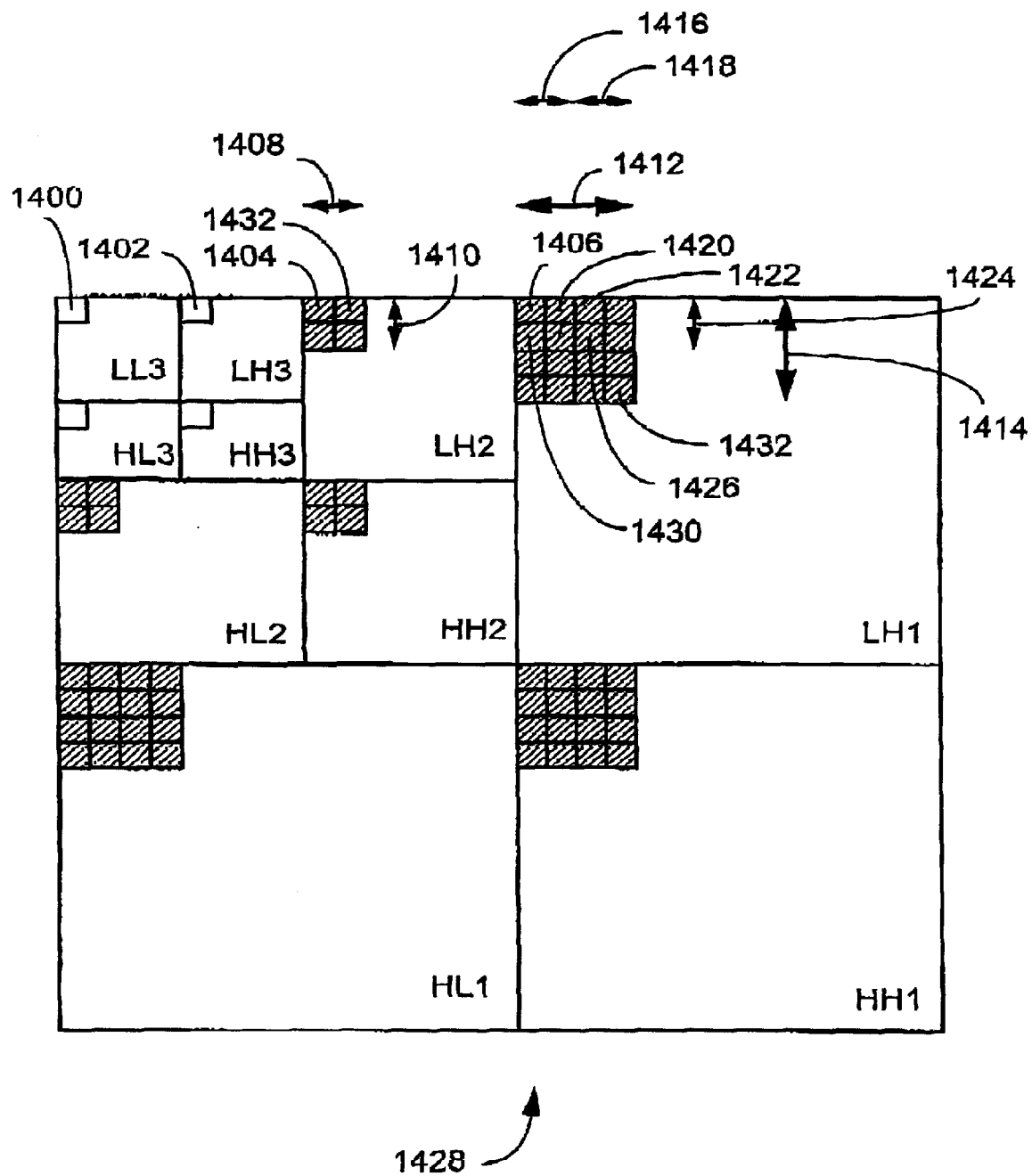
FIG. 9 depicts reordering for 2-D data in a block embodiment.

FIG. 9 describes a different process for a two dimensional data set 1428, according to case B, where unlike the process described in relation to FIG. 6 which supports a scan-line output mode, FIG. 9 supports output of multiple-scan lines. In Case B, where the band buffer at the decoder is deep enough to accommodate the full output area that a block at the lowest level contributes to, it is more effective to decode and perform all inverse operations that are required to decompress that area. This is because all intermediate data is used immediately, and thereafter any buffer associated with said intermediate data may be released, further reducing total memory requirements. Note when using this method, there are a number of different ways of sequencing the blocks within the stream that contributes to a particular output area covered by the DC block and associated triplet at the lowest level. The optimal implementation in this case is to a band buffer that can accommodate $2^{j-1}$ blocks in the vertical direction. In that case, a block at the lowest level will fully contribute to the resultant area, and the data from that block will not be required again. If such depth in the band structure cannot be accommodate, then it is apparent to one skilled in the art that a similar procedure may be adopted to create band output in an optimal fashion where the band dimensions still fall within the broad category defined in Case B.

It is apparent that a special situation exists at boundaries, however the process described, for example, in relation to FIG. 9, may be readily adapted in this regard.

In order to obtain the first data segment 726 (see FIG. 4), transform segments 1400 to 1406 are required and immediately selected (again noting that triplets are being referred to). Due to the upsampling process, the segment 1400 contributes to inverse transformability for four segments bounded by arrows 1408 and 1410 in the next higher resolution sub-band, and for sixteen segments bounded by arrows 1412 and 1414 in the following higher resolution sub-band. Similarly, the segment 1404 contributes to inverse transformability for four segments bounded by arrows 1416 and 1424 in the next higher resolution sub-band. Segments 1420, 1422 and 1430 are thus immediately inverse transformable, falling "within the span" of arrows 1412 and 1414, and also arrows 1416 and 1424, and are thus immediately selected. In contrast, a segment 1426 falls within the span of 1412 and 1414, however outside the span of 1416, 1424, and therefore a segment 1432 must first be selected in order to contribute to the inverse transformability of the segment 1426 as shown by the arrows 1416 and 1424. Unlike scanline processing, the processing mode described in FIG. 9 enables all transform data associated with the segment 1400 to be used, after which it may all be discarded, and the memory used to store the data made available for other data, ignoring for the moment any boundary effects associated with filter overlap. In this embodiment, for the assumed transform depth of three levels, the first portion of the optimal reordering is:

$DC_{(1,1)}, T3_{(1,1)}, T2_{(1,1)}, T1_{(1,1)}, T1_{(1,2)}, T1_{(2,1)}, T1_{(2,2)}, T2_{(1,2)}, T1_{(1,3)}, T1_{(1,4)}, T1_{(2,3)}, T1_{(2,4)}, T2_{(2,1)}, T1_{(3,1)}, T1_{(3,2)}$ . . . .

A Hybrid process is also possible, falling between scanline processing and the processing described in relation to FIG. 9. This enables a trade off between processing speed and memory requirements.

Figure 10:
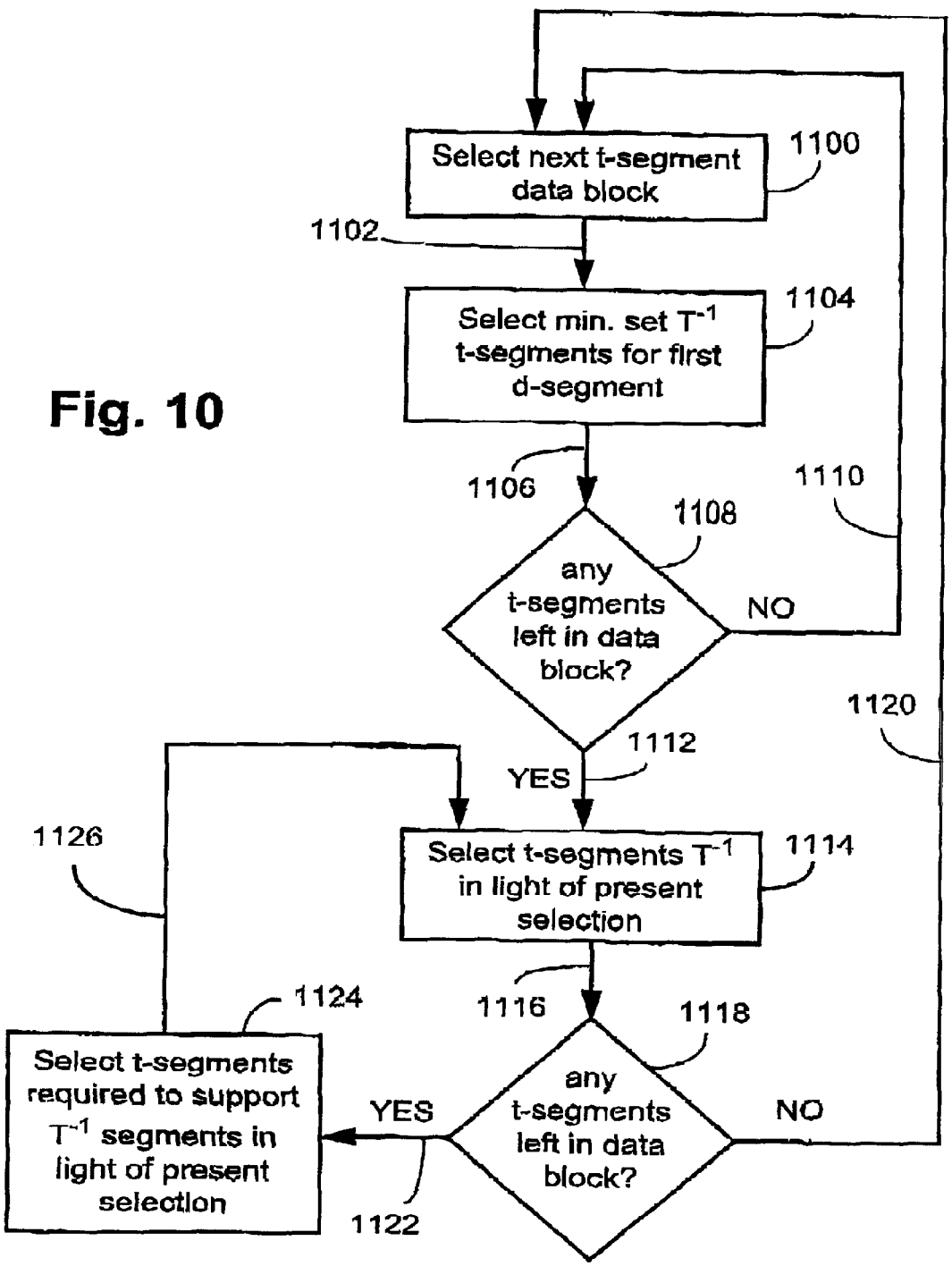
FIG. 10 illustrates a general process flow for segment reordering in a preferred embodiment.

FIG. 10 illustrates a general process flow for re-ordering in a preferred embodiment. As before, the term "selection" infers "selection for positioning in the re-ordered data stream". In a first process block 1100, general process is directed to the next transformed data block (referred to as a t-segment data block). Moving to process block 1104, a minimum set of t-segments is selected from the t-segment data block, this being the minimum set required to decode/inverse transform the first data segment (referred to as a d-segment). Referring to the one-dimensional case described in relation to FIG. 2 this minimum set comprises t-segments 426–432, and the first data segment or d-segment is segment 424. Thereafter, a process block 1108 tests whether any t-segments are left in the data block (i.e. t-segments which have not been selected and thus placed in the reordered data stream). If there are no such t-segments, then the general process loops back to process 1100. If, however, further t-segments are still available which have not yet been selected, a process block 1114 selects all t-segments which are immediately inverse-transformable (as depicted by the symbol $T^1$ in the figure) in light of previously selected t-segments. Thereafter, a further test for t-segments is performed in a process block 1118. If t-segments (designated group A) are found to be available, but are not immediately inverse transformable in light of previously selected t-segments, then process block 1124 selects t-segments (designated group B) required to support immediate inverse transformability. Those t-segments in group A which are thereby immediately inverse transformable are selected in process block 1114.

Figure 11:
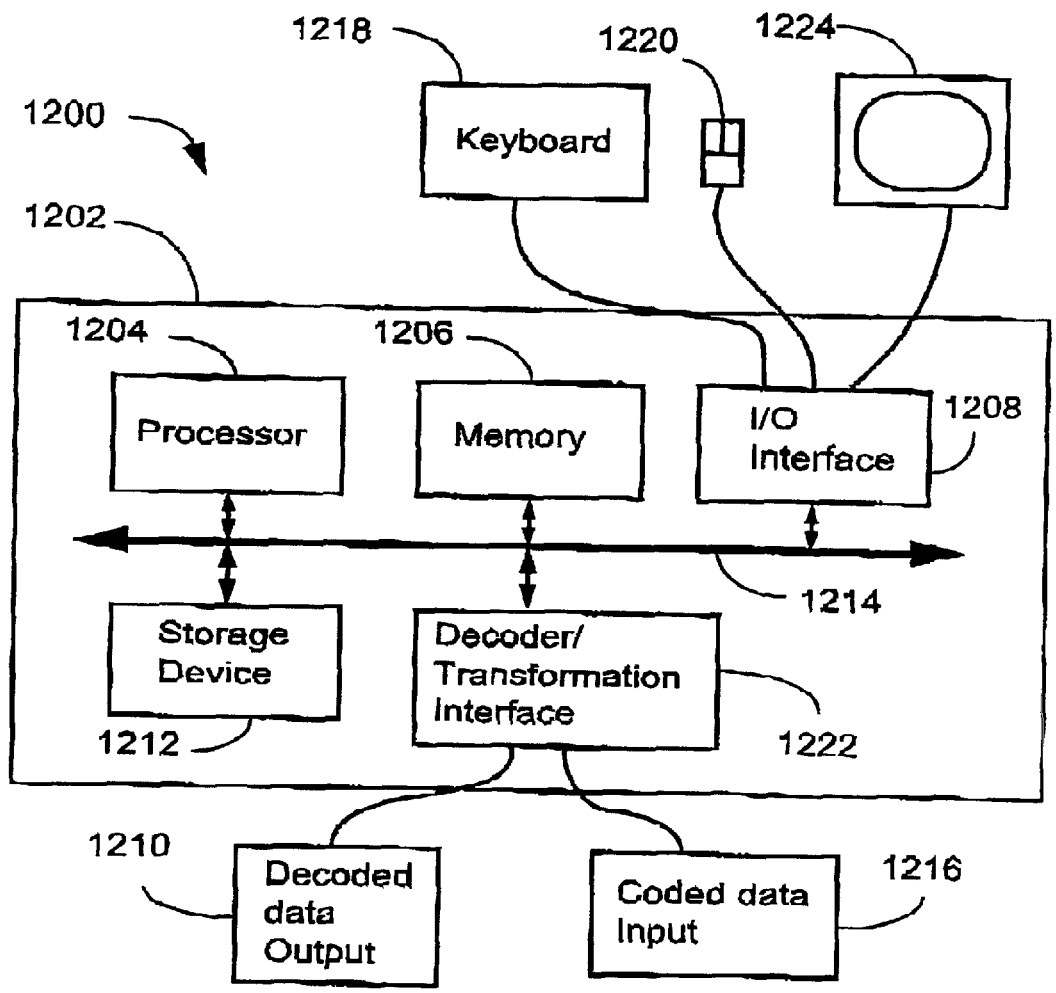
FIG. 11 illustrates a general purpose computer upon which the preferred embodiments, can be practiced.

The method of block reordering is preferably practiced using a conventional general-purpose computer system 1200, such as that shown in FIG. 11 wherein the processes of FIGS. 14, 15 and 16 may be implemented as software, such as an application program executing within the computer system 1200. In particular, the steps of the method of block re-ordering are effected by instructions in the software that are carried out by the computer. The software may be divided into two separate parts; one part for carrying out the block reordering methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for block reordering in accordance with the embodiments of the invention.

The computer system 1200 comprises a computer module 1201, input devices such as a keyboard 1202 and mouse 1203, output devices including a printer 1215 and a display device 1214. A Modulator-Demodulator (Modem) transceiver device 1216 is used by the computer module 1201 for communicating to and from a communications network 1220, for example connectable via a telephone line 1221 or other functional medium. The modem 1216 can be used to obtain access to the Internet, and other network systems, such as a Local Area Network (LAN) or a Wide Area Network (WAN).

The computer module 1201 typically includes at least one processor unit 1205, a memory unit 1206, for example formed from semiconductor random access memory (RAM) and read only memory (ROM), input/output (I/O) interfaces including a video interface 1207, and an I/O interface 1213 for the keyboard 1202 and mouse 1203 and optionally a joystick (not illustrated), and an interface 1208 for the modem 1216. A storage device 1209 is provided and typically includes a hard disk drive 1210 and a floppy disk drive 1211. A magnetic tape drive (not illustrated) may also be used. A CD-ROM drive 1212 is typically provided as a non-volatile source of data. The components 1205 to 1213 of the computer module 1201, typically communicate via an interconnected bus 1204 and in a manner which results in a conventional mode of operation of the computer system 1200 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 1210 and read and controlled in its execution by the processor 1205. Intermediate storage of the program and any data fetched from the network 1220 may be accomplished using the semiconductor memory 1206, possibly in concert with the hard disk drive 1210. In some instances, the application program may be supplied to the user encoded on a CD-ROM or floppy disk and read via the corresponding drive 1212 or 1211, or alternatively may be read by the user from the network 1220 via the modem device 1216. Still further, the software can also be loaded into the computer system 1200 from other computer readable medium including magnetic tape, a ROM or integrated circuit, a magneto-optical disk, a radio or infra-red transmission channel between the computer module 1201 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of block reordering may alternatively be implemented in dedicated hardware such as one or more integrated circuits performing the functions or sub functions of block reordering. Such dedicated hardware may include graphic processors, digital signal processors, or one or more microprocessors and associated memories.

A procedure, written in the "C" language, relating to one-dimensional data-set re-ordering is now provided:

Industrial Applicability

It is apparent from the above that the embodiments of the invention are applicable to the computer and data processing industries.

The foregoing describes only one embodiment/some embodiments of the present invention, and modifications and/or changes can be made thereto without departing from the scope and spirit of the invention, the embodiments being illustrative and not restrictive.

The aforementioned preferred methods comprise a particular ordering flow. There are many other variants of the preferred methods which use different orders, without departing from the spirit or scope of the invention. Furthermore, one or more of the steps of the preferred methods may be performed in parallel rather than sequentially.

What is claimed is:

1. A method of ordering transform segments from an image for an image decoder, the ordering of the segments being such that the ordering results in a smaller set of transform segments that need to be stored, thus reducing a size of storage means in the image decoder, said ordering comprising the steps of:

selecting, for positioning in an ordered data stream, a first set of the transform segments being suitable for direct recovery of a first data segment of the image;

selecting, for positioning in the ordered data stream, a second set of the transform segments being suitable dependent upon the first set for direct recovery of a second data segment of the image;

```
#include <stdio.h>
int
nextlevel (level)
{
    int k;
    for (k=1; k<=2) {
        Output [n++] = sprintf ("H%i", level, ", %i", segmentid [level], "\n");
        segmentid [level]++;
        if (level>1)
                nextlevel (level-1);
    }
}
/* need a global variable */
int n=0
int
main( )
{
    int level, i, k, s, segmentid [ ];
    /* We need somewhere to put the ordered level/segment identifiers */
    string Output[ ];
    /* Let's assume 4 levels and 10 segments per subband at level 4 */
    int j=4, total_segments_per_subband_at_levelj=10;
    level =j;
    /* Now let's initialise a segment id for each level */
    for (i=j; i>0; i--)
        segmentid [i] =1
    /* Now let's get started on the ordering */
    for (s=1; s<=total_segments_per_subband_at_levelj/2) [ /* the /2 is
because of the next loop */
        for (k=1; k<=2) [
            Output (n++) = sprintf ("L%i", level, ", %i", segmentid [level], "\n");
            Output (n++) = sprintf ("H%i". level, ", %i", segmentid [level], "\n");
            segmentid [level]++;
            nextlevel (level-1);
        }
    }
}
``` determining, from at least one of the first and the second sets, a third set of transform segments, for positioning in the ordered data stream, the third set being suitable dependent upon the at least one of the first and second sets, for direct recovery of a third data segment of the image if a fourth set of the transform segments is used; and selecting, for positioning in the ordered data stream, the fourth set of the transform segments.

2. A method of ordering transform segments from an image for an image decoder, the ordering of the segments being such that the ordering allows immediate application of an inverse discrete wavelet transform, thereby reducing a latency in the image decoder, said ordering comprising the steps of:.

selecting, for positioning in an ordered data stream, a first set of the transform segments being suitable for direct recovery of a first data segment of the image;

selecting, for positioning in the ordered data stream, a second set of the transform segments being suitable dependent upon the first set for direct recovery of a second data segment of the image;

determining, from at least one of the first and the second sets, a third set of transform segments, for positioning in the ordered data stream, the third set being suitable dependent upon the at least one of the first and second sets, for direct recovery of a third data segment of the image if a fourth set of the transform segments is used; and selecting, for positioning in the ordered data stream, the fourth set of the transform segments.

3. A method of ordering transform segments from an image for an image decoder, the ordering of the segments being such that the ordering allows raster operation of the image decoder for scanlines or bands, said ordering comprising the steps of:

selecting, for positioning in an ordered data stream, a first set of the transform segments being suitable for direct recovery of a first data segment of the image;

selecting, for positioning in the ordered data stream, a second set of the transform segments being suitable dependent upon the first set for direct recovery of a second data segment of the image;

determining, from at least one of the first and the second sets, a third set of transform segments, for positioning in the ordered data stream, the third set being suitable dependent upon the at least one of the first and second sets, for direct recovery of a third data segment of the image if a fourth set of the transform segments is used; and selecting, for positioning in the ordered data stream, the fourth set of the transform segments.

4. A computer readable memory medium storing a program for an apparatus which orders transform segments from an image for an image decoder, said program comprising code whereby the ordering of the segments is such that the ordering results in a smaller set of transform segments that need to be stored, thus reducing a size of storage means in the image decoder, said program comprising:

code for selecting, for positioning in an ordered data stream, a first set of the transform segments being suitable for direct recovery of a first data segment of the image;

code for selecting, for positioning in the ordered data stream, a second set of the transform segments being suitable dependent upon the first set for direct recovery of a second data segment of the image;

code for determining, from at least one of the first and the second sets, a third set of transform segments, for positioning in the ordered data stream, the third set being suitable dependent upon the at least one of the first and the second sets, for direct recovery of a third data segment of the image if a fourth set of the transform segments is used; and code for selecting, for positioning in the ordered data stream, the fourth set of transform segments.

5. A computer readable memory medium storing a program for an apparatus which orders transform segments from an image for an image decoder, said program comprising code whereby ordering of the segments is such that the ordering allows immediate application of an inverse discrete wavelet transform, thereby reducing a latency in the image decoder, said program comprising code for selecting, for positioning in an ordered data stream, a first set of the transform segments being suitable for direct recovery of a first data segment of the image;

code for selecting, for positioning in the ordered data stream, a second set of the transform segments being suitable dependent upon the first set for direct recovery of a second data segment of the image;

code for determining, from at least one of the first and the second sets, a third set of transform segments, for positioning in the ordered data stream, the third set being suitable dependent upon the at least one of the first and the second sets, for direct recovery of a third data segment of the image if a fourth set of the transform segments is used; and code for selecting, for positioning in the ordered data stream, the fourth set of the transform segments.

6. A computer readable memory medium storing a program for an apparatus which orders transform segments from an image for an image decoder, said program comprising code whereby ordering of the segments is such that the ordering allows raster operation of the image decoder for scanlines or bands, said program comprising:

code for selecting, for positioning in an ordered data stream, a first set of the transform segments being suitable for direct recovery of a first data segment of the image;

code for selecting, for positioning in the ordered data stream, a second set of the transform segments being suitable dependent upon the first set for direct recovery of a second data segment of the image;

code for determining, from at least one of the first and the second sets, a third set of transform segments, for positioning in the ordered data stream, the third set being suitable dependent upon said at least one of the first and the second sets, for direct recovery of a third data segment of the image if a fourth set of the transform segments is used; and code for selecting, for positioning in the ordered data stream, the fourth set of the transform segments.

7. A method according to claim 1, wherein the first set of the transform segments lies on a segment scan line.

8. A method according to claim 1, wherein the first set of the transform segments, apart from a segment from a low frequency sub-band, comprises triplets of segments where each triplet comprises transform segments from a high frequency sub-band.

9. A method according to claim 1, wherein said steps of determining the third set of the transform segments and selecting the fourth set of the transform segments are performed alternatively until all transform segments in the block have been selected.

10. A computer readable memory medium according to claim 4, wherein the code for said first selecting step is adapted to select the first set of the transform segments to comprise, apart from a segment from a low frequency sub-band triplets of segments where each triplet comprises transform segments from a high frequency sub-band.

11. A computer readable memory medium according to claim 4, wherein the code for said determining step for determining the third set of the transform segments, and the code for the step of selecting the fourth set of the transform segments, are executed iteratively until all transform segments in the block have been selected.

12. A method according to claim 1, wherein the data segments of the image have a predetermined size, and the transform segments have a predetermined size.

13. A method according to claim 12, wherein the first, second, third, and fourth sets of transform segments are the minimum sets of transform segments for direct recovery of the first, second, and third data segments of the image.

14. A method according to claim 13, wherein the first, second and third data segments are adjacent data segments in the image.

15. A method according to claim 2, wherein the first set of the transform segments corresponds to a portion of LL3, the second set of the transform segments corresponds to a portion of LH3, HH3, or HL3, the third set of the transform segments corresponds to a portion of LH2, HH2 or HL2, and the fourth set of the transform segments corresponds to a portion of LH1, HH1, or Hl1.

16. A computer readable memory medium according to claim 5, wherein the first set of the transform segments corresponds to a portion of LL3, the second set of the transform segments corresponds to a portion of LH3, HH3 or HL3, the third set of the transform segments corresponds to a portion of LH2, HH2, or HL2, and the fourth set of the transform segments corresponds to a portion of LH1, HH1, or HL1.

* * * * *

UNITED STATES PATENT AND TRADEMARK OFFICE
CERTIFICATE OF CORRECTION

PATENT NO. : 6,801,667 B1
DATED : October 5, 2004
INVENTOR(S) : Timothy John Lindquist It is certified that error appears in the above-identified patent and that said Letters Patent is hereby corrected as shown below:

Column 1,
Line 33, "where-after" should read -- whereafter --.

Column 6,
Line 40, "non overlapping." should read -- non-overlapping. --.

Column 8,
Line 10, "and" (second occurrence) should read -- an --;
Line 45, "being" should read -- begin --; and
Line 46, "decoder/inverse" should read -- decode/inverse --.

Column 9,
Line 51, "Hybrid" should read -- hybrid --.

Column 13,
Line 15, "of:." should read -- of: --.

Column 14,
Line 18, "comprising" should read -- comprising: --.

Signed and Sealed this

Twenty-first Day of June, 2005

JON W. DUDAS
*Director of the United States Patent and Trademark Office*